March 19, 1935.　　　　K. EHRGOTT　　　　1,994,909

ELECTRIC COOKING APPLIANCE

Filed Aug. 25, 1933

WITNESSES:　　　　　　　　　　　　　　　INVENTOR
　　　　　　　　　　　　　　　　　　　　Karl Ehrgott.
　　　　　　　　　　　　　　　　　　　　BY
　　　　　　　　　　　　　　　　　　　　　　ATTORNEY Patented Mar. 19, 1935

1,994,909

UNITED STATES PATENT OFFICE 1,994,909

ELECTRIC COOKING APPLIANCE

Karl Ehrgott, Mansfield, Ohio, assignor to Westinghouse Electric & Manufacturing Company, East Pittsburgh, Pa., a corporation of Pennsylvania Application August 25, 1933, Serial No. 686,761

11 Claims. (Cl. 219—43)

My invention relates to electrically heated devices and particularly to electric cooking devices.

An object of my invention is to provide an electric cooking device, adapted to cook with hot fat, that shall be relatively simple, inexpensive and made up of a minimum number of parts.

Another object of my invention is to provide an electric cooking device, adapted to cook with hot fat, that shall be easily and quickly assembled and disassembled for cleaning.

Another object of my invention is to provide a deep fat fry kettle assembly in which the kettle shall be frictionally held within an outer casing while permitting direct and immediate removal therefrom.

Another object is to provide a fry kettle that shall embody an immersion heating unit supported by a connecting socket on the outside of the assembled device.

Another object is to provide an electrically heated device that shall embody means for preventing over-shooting of the temperature of fluid material being heated upon rise of temperature thereof.

Other objects will appear hereinafter.

In practicing my invention, I provide an outer main casing having an open top and an opening in the side wall thereof at one place, which opening is covered by a smaller auxiliary casing or cover. A kettle is suspended within the main casing, being supported from the upper edge thereof and is frictionally held within the main casing by means including a thermally actuable switch assembly spring pressed through the opening in the main casing against the outer surface of the kettle. A connecting socket is located in the auxiliary casing or cover at the upper end portion thereof and an encased heating element has one portion thereof located near the bottom of the kettle and has a goose-neck end portion passing close to the thermal switch assembly, a connecting plug being located in the extreme end of the heating unit which cooperates with the connecting socket not only to effect energization of the heating unit, but also to removably support the same in its proper operative position.

Figure 1:
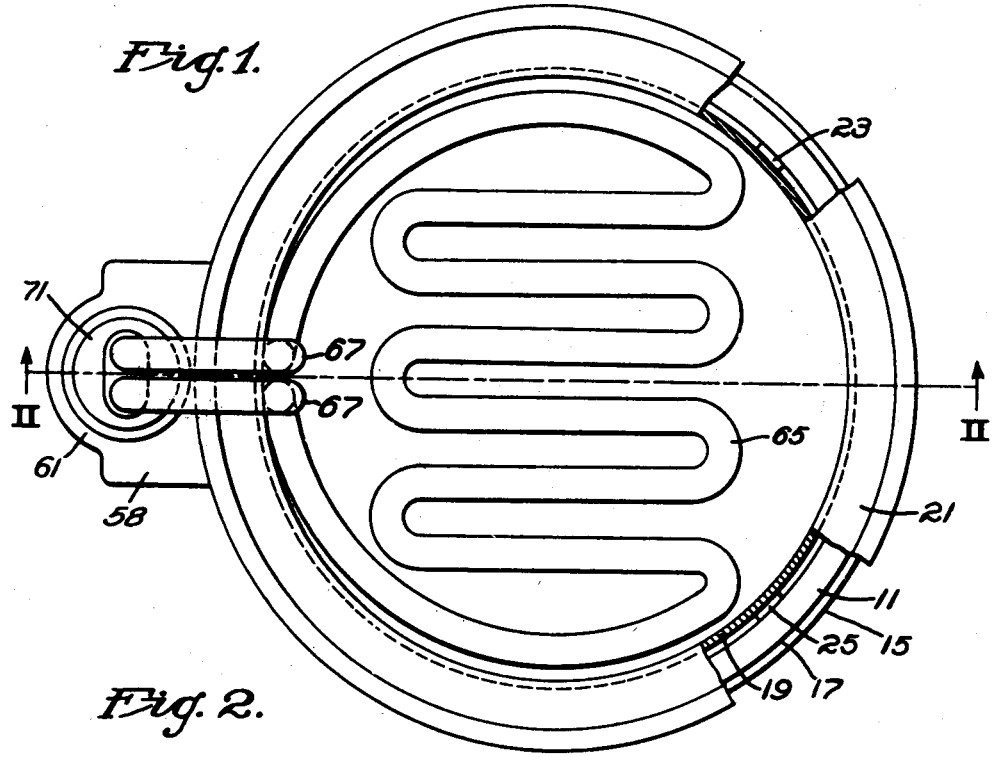
Figure 1 is a top plan view of a device embodying my invention.

The deep fat fry kettle embodying my invention includes an outer open top casing 11 which may be of sheet metal, and which is provided adjacent its bottom edge with an inner angle bar ring 13 suitably secured thereto, which ring constitutes a means for securing to the casing 11 a bottom supporting ring 15, which may be secured to the ring member 13 integrally, as shown, or in any other desired manner. The upper edge portion of the main casing 11 is provided with a roll rim 17 in order that a fry kettle or receptacle 19 may be located within the casing and supported from the roll rim edge portion 17. To this end the kettle 19 has an expanded upper end portion 21 providing an annular shoulder adapted to rest upon the roll rim 17.

It is desirable that the kettle 19 be spaced from the inner surface of the vertical walls of casing 11, and to this end I provide a pair of vertically extending spacing bars 23 and 25, shown more particularly in Fig. 1 of the drawing, which may be spaced apart about one-third of the total periphery.

The vertical wall of main casing 11 is provided with a suitable opening 27 which may be either of oblong or of circular shape, and through which there extends a thermostatic switch assembly 29, including more particularly a metal shoe 31 which is adapted to extend radially inwardly through the opening 27 and operatively engage the vertical wall of the kettle 19 at a point substantially diametrically opposite to the mid-point between the peripherally spaced bars 23 and 25. This provides a means for frictionally holding the kettle in the casing while it is supported thereby on the upper rim of the casing.

Means for yieldingly pressing the shoe member 31 radially inwardly may include a bracket 33, of substantially U-shape, extending vertically and having its upper end secured against a spacing block 35 secured against the vertical wall of casing 11; the lower end of bracket 33 being secured against a spacing block 37. The spacing blocks 35 and 37 may be held in place by screws 39 and 41, respectively, which may extend through the blocks 35 and 37 and have screw threaded engagement with the wall of casing 11. A pair of machine screws 43 and 45 extend radially inwardly through the intermediate portion of bracket 33, springs 47 and 49 being disposed around screws 43 and 45, respectively, between the bracket and the shoe 31, into which the ends of screws 43 and 45 are threaded, to yieldingly press the shoe radially inwardly. A cover or auxiliary casing member 51 of suitable shape is provided to cover the bracket, and the other parts associated therewith and hereinbefore described. Cover 51 may be held in place by a plurality of screws 53, only one of which is shown at the bottom of cover 51 in Fig.

2 of the drawing. A conductor bushing 55 extends through the bottom portion of cover 51 to permit of introducing the ends of supply circuit conductors shown generally only at 57. At the upper end of cover 51 there is provided a horizontally extending cover plate 58 having an outer depending flange 61 overhanging the upper edge of auxiliary casing or cover 51, in order to preclude hot fat or other liquids from entering the auxiliary casing.

The cover plate 58 is provided with an opening therethrough in which there is held, a connecting socket 63 by means of a clamping plate 64.

Figure 2:
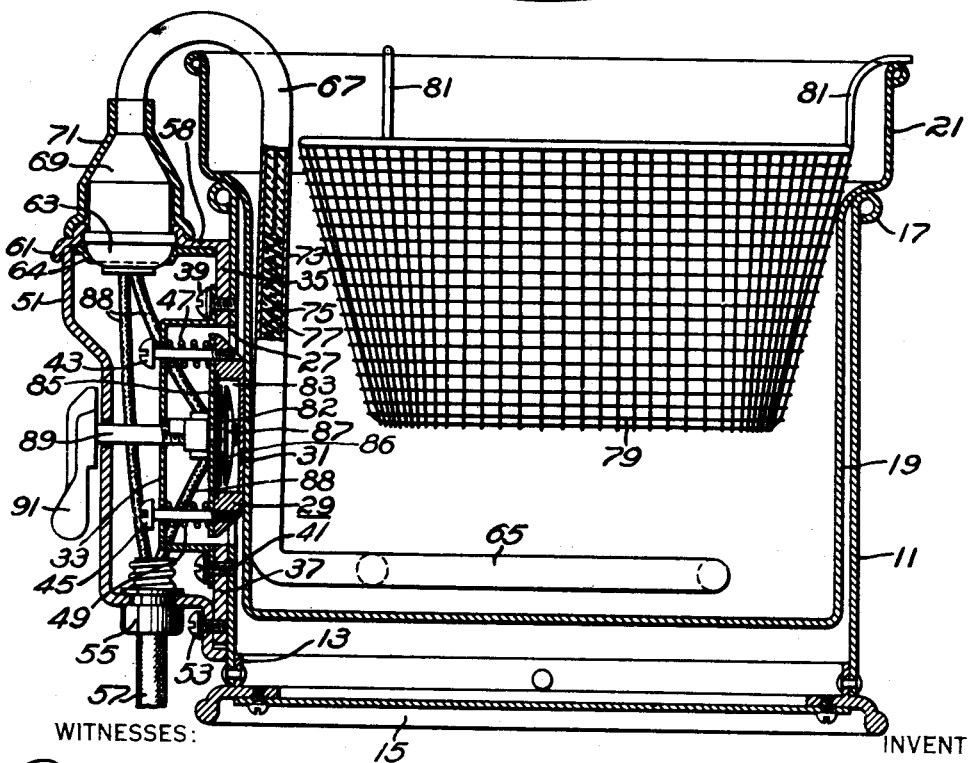
Fig. 2 is a view in vertical section therethrough, taken on the line II—II of Fig. 1.

A heating unit of the metal encased immersion type is indicated at 65 and includes a main portion located just above the bottom of the kettle 19 and bent to constitute a grid, as shown more particularly in Fig. 1 of the drawing. The heating unit 65 includes also upwardly extending end portions 67 which are of goose-neck or return-bent shape, as shown more particularly in Fig. 2 of the drawing, the extreme ends of which have secured thereto in any desired manner a connecting plug 69 adapted to cooperate with the connecting socket 63. The connecting plug 69 is surrounded by a suitable cover 71 which has a flanged lower end for fitting over cover plate 58, so as to prevent entry of hot fat to the inside of cover 51. It is to be especially noted that the heating unit hereinbefore described is not supported by or from the kettle 19 but is supported solely by the cooperative effect of socket 63 and of plug 69, it being noted that the lower end portions of parts 67 will engage the wall of kettle 19 at its inside surface.

The particular kind of encased heating unit employed is immaterial, but for purposes of illustration, I desire to point out that the heating unit 65 includes an outer metal tube 73 and a resistor element 75 located therein, and spaced therefrom by electric insulating material 77, which latter may be of any suitable kind now available for such purposes. I wish to point out also that the resistor 75 may be wound to helical form in order to increase the amount of ohmic resistance available in a given length, and that this helically wound portion extends also through a greater portion of part 67, or at least well above the upper edge of shoe 31.

Means for supporting materials to be cooked in either hot fat to be located in kettle 19, or any other fluid which may be useful or available for such purposes, may include a foraminous basket 79 which is supported within the kettle 19 by a plurality of upwardly curved lugs or arms 81.

It is, of course, highly desirable in a cooking device of this kind that it be automatically controlled and maintained, and for this purpose the shoe 31 is provided on its outer surface with an annular recess 83 in which there is located a thermostatic switch assembly including more particularly a circular base 85 having contacts 82 thereon, and a snap-acting bimetal disc 87 with contacts 86 mounted thereon. The thermostat may preferably be of the kind disclosed and claimed in Patent No. 1,448,240 to J. A. Spencer. It will be noted that suitable electric conductors 88 are provided to effect connection between the supply circuit leads 57, the terminals of the thermostatic switch assembly including the disc 87 and its contacts 86, and the conducting members in connecting socket 63, whereby the circuit through the resistor 75 will be closed when the disc is in the position shown in the drawing, and will be interrupted when it is in its other position.

In order to provide means for varying the temperature, the disc 87 is mounted on a stud 89 having screw threaded engagement with the base 85 so that upon turning the same angularly the midpoint of the disc 87 will be moved either toward or away from the base and the contacts thereon, whereby the operating or critical temperature of the thermostatic switch can be varied. An operating lever 91 is secured to the outer end of stud 89 which, as shown in the drawing, extends not only through the bracket 33, but also through cover member 51, so that an operator can easily and quickly effect a change in the operating temperature of the thermostatic switch assembly.

Insofar as I am aware, most, if not all, of the devices of this general kind in the prior art or in actual use have not permitted of easy and quick disassembly for cleaning purposes, and I wish to point out that the illustrated heating unit and kettle for containing the cooking fluid are directly and immediately removable in an upward direction. Thus, if the basket 79 has been removed, it is only necessary that the heating unit 65 and plug 69 be pulled substantially straight upwardly by grasping goose-neck portion 67, in order to remove them from the assembly, after which the kettle 19 can also be easily and quickly removed in an upward direction, the contents remaining therein can be poured out, after which both the heating unit (with the exception of the connecting plug) and the kettle can be given a thorough cleaning to effect removal of any of the cooking fluid which may have been overheated and caused to adhere to either the heater or the inside of the fry kettle. Assembly can be of course also easily and quickly effected, it being noted that when the kettle is removed or replaced, this action must be effected against the friction of the outer surface of the wall of the kettle with shoe 31, and spacing bars 23 and 25. The bars 23 and 25 are made as narrow as possible, in order that a minimum heat conducting surface or path be provided between the kettle 19 and the outer casing 11.

It is to be further noted that the end portions 67 of the heating unit, which extend upwardly in close proximity to the shoe 31, serve a double purpose. A snap-acting bimetal disc, such as is used, has a relatively large temperature differential of operation, that is, the difference between its on and off temperatures will be relatively high, and it is, of course, also obvious that as the heating unit is hotter than the fluid which it is to heat, there will be a tendency to overshooting of the temperature, particularly when the cooking fluid is being heated or reheated, that is, at the time its temperature is being raised. As I desire to have a part of the resistor constitute means for preventing overshooting of the temperature of the heating fluid when it is being reheated, I locate the end portions 67 in such manner that they extend past the shoe 31, being spaced a small distance from the wall of kettle 19 at that point. It will be obvious that, while the shoe 31, which is, of course, wider than the combined width of the two portions 67, will be affected mainly by the temperature of the cooking fluid within the kettle 19, the shoe 31, and of course, the disc 87 therein, will also be affected by heat generated in the portions 67 of the heating unit. Thus, the thermostatic disc 87 is subjected to heat from two sources, namely, that from the cooking fluid which it is desired to control, and that from the resistor in the end portions 67, and I have found a decided and advantageous effect of the latter upon the thermostatic disc in that it tends to reduce overshooting of the temperature by causing interruption of the circuit through the resistor 75 before the desired temperature is attained.

The device embodying my invention thus provides a relatively simple electric cooking device embodying a minimum number of quickly disassemblable parts and embodying further a heating unit which is supported by means outside of the kettle within which it is located, the said supporting means being at the top of an auxiliary casing and covered in such manner as to prevent entrance of the cooking fluid or of any fluid within the auxiliary casing or cover where damage might result to the connecting members and the thermal control device.

It is to be understood that, while I have illustrated and described a specific embodiment of my device, I do not desire to be limited thereto, as certain aspects of the invention may be applied to other electric heating devices and my invention is, therefore, to be limited only by the prior art or by the appended claims.

I claim as my invention:

1. An electric heating device including a main casing, a receptacle fitting loosely therein and supported thereby, a connector member secured to and located on the outside of the casing, and a heating unit depending into the receptacle, said heating unit being supported by the connector member.

2. An electric heating appliance including a main casing, a receptacle fitting loosely in the casing and directly removable therefrom by an upward movement thereof; an auxiliary casing secured to the outside of the main casing, a connector member supported by the auxiliary casing at its upper end, and a heating unit extending into the receptacle and having a connecting member engaging the first-named connector member to effect energization of the heating unit and to support the same, and directly removable therefrom by an upward movement of the heating unit.

3. An electric heating device including an open top main casing, an open top receptacle in the casing supported by the top edge of the casing, spacing strips in the casing, a heating unit in the receptacle, and a thermal control switch for the heating unit resiliently supported substantially outside of and by the casing and engaging the receptacle to frictionally hold it in proper operative position within the casing.

4. An electric heating device including a main casing, a kettle therein adapted to contain material to be heated, a heating unit within the kettle, a metal shoe supported by the casing, spring means pressing the shoe against the outside surface of the kettle, the main casing having an opening at its side for that purpose, and a thermal switch in the metal shoe to control the heating unit substantially in accordance with the temperature of the heated material in the kettle.

5. An electric heating apparatus including an open top main casing, a receptacle in the main casing, a heating unit operatively associated with the receptacle, and means including a thermostatic switch assembly controlling the heating unit and frictionally holding the receptacle in the casing.

6. A deep fat fry kettle assembly including an open top main casing, a kettle in the main casing supported by the top edge of the casing, an upwardly-extending connecting member at the outside of the casing, a heating unit in the kettle and having a goose neck end, and a connecting member at the goose neck end of the heating unit operatively engaging the first-named connecting member to effect energization of the heating unit and to support the same.

7. An electric heating device including a kettle, an immersion electric heater of the enclosed type in the kettle having its said portions extending upwardly closely adjacent to the wall of the kettle on the inside thereof, and a thermostatic switch assembly engaging the wall of the kettle at the outside thereof and radially alined with the end portions of the heater, whereby the end portions of the heater constitute means for preventing overshooting of the temperature of the material in the kettle.

8. An electric heating device including a container for heated fluid, an electric heating element in the container immersed in the heated fluid and having a part of the element extending adjacent to the inside of the wall of the container at a certain place; and a thermal switch for the heating element operatively engaging the outside of the wall of the container at said certain place, said part of the heating element constituting means for preventing overshooting of the temperature of the fluid when being heated.

9. An electric heating device including a container for heated fluid, a thermal switch engaging the outer surface of the wall of the container and an electric heating element located in the container controlled by said thermal switch and having a portion thereof extending adjacent to and past the thermal switch to preclude overshooting of the temperature of the fluid upon increase of temperature thereof.

10. A deep fat fry kettle assembly including a main casing, a fry kettle within the casing, a connecting socket secured to and at one side of the main casing, an immersion heating unit in the kettle and having a goose neck end portion, a connecting plug at the ends of the heating unit cooperating with the socket to effect energization of the heating unit and to support the same, and means on the connecting plug and the socket to shed heated fat from the plug and socket.

11. A deep fat fry kettle assembly including a main casing, a fry kettle therein, a small auxiliary casing at one side of the main casing, a connecting member at the upper end of the auxiliary casing secured thereto and supported thereby, an electric heating unit in the kettle and having a connecting member thereon to cooperate with the first-named connecting member, and means on the second-named connecting member to shed hot fat therefrom.

KARL EHRGOTT.